(12) United States Patent
Parks et al.

(10) Patent No.: US 7,195,090 B2
(45) Date of Patent: Mar. 27, 2007

(54) VEHICLE HOOD LATCH RELEASE SYSTEM FOR IMPROVED PEDESTRIAN PROTECTION

(75) Inventors: Brent T. Parks, Englewood, CO (US); Michael R. Schramm, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 158 days.

(21) Appl. No.: 10/919,111

(22) Filed: Aug. 16, 2004

(65) Prior Publication Data

US 2006/0032693 A1 Feb. 16, 2006

(51) Int. Cl.
*B60D 1/28* (2006.01)
(52) U.S. Cl. ...................................... 180/271
(58) Field of Classification Search ................ 180/271, 180/274, 281, 69.21, 69.1; 296/203.02, 189, 296/194
See application file for complete search history.

(56) References Cited

U.S. PATENT DOCUMENTS

| 5,431,460 | A | 7/1995 | Hass et al. |
| 5,456,142 | A | 10/1995 | Mosher et al. |
| 5,618,069 | A | 4/1997 | Konchan et al. |
| 5,853,060 | A | 12/1998 | Chao et al. |
| 6,092,845 | A | 7/2000 | Koenig |
| 6,106,033 | A | 8/2000 | Rückert |
| 6,390,529 | B1 | 5/2002 | Bingle et al. |
| 6,439,330 | B1* | 8/2002 | Paye ........................ 180/69.21 |
| 6,480,103 | B1 | 11/2002 | McCarthy et al. |
| 6,485,081 | B1 | 11/2002 | Bingle et al. |
| 6,547,291 | B1* | 4/2003 | Schwaiger .................. 292/216 |
| 6,588,526 | B1 | 7/2003 | Polz et al. |
| 6,621,411 | B2 | 9/2003 | McCarthy et al. |
| 2002/0135196 | A1 | 9/2002 | Bingle et al. |
| 2002/0196131 | A1 | 12/2002 | McCarthy et al. |
| 2003/0102688 | A1 | 6/2003 | Bingle et al. |

FOREIGN PATENT DOCUMENTS

| DE | 197 21 565 A1 | 5/1997 |
| DE | 197 10 417 A1 | 9/1998 |
| GB | 2 387 577 A | 10/2003 |
| GB | 2 387 578 A | 10/2003 |
| GB | 2 387 581 A | 10/2003 |

\* cited by examiner

*Primary Examiner*—Faye M. Fleming
(74) *Attorney, Agent, or Firm*—Sally J Brown; Brinks Hofer Glison & Lione

(57) ABSTRACT

A hood latch release mechanism for a motor vehicle of the type incorporating a hood which pivots at near the front edge of the hood. The hood latch release system enables the hood to be opened in a manner to provide enhanced pedestrian impact protection in the event of an impending pedestrian impact with the hood. The system incorporates a hood latch mechanism which is manually actuatable by the operator to permit access to the vehicle's engine compartment and operates automatically to the response to an impending pedestrian impact. The hood latch release system may be implemented with an active hood lifting actuator.

9 Claims, 2 Drawing Sheets

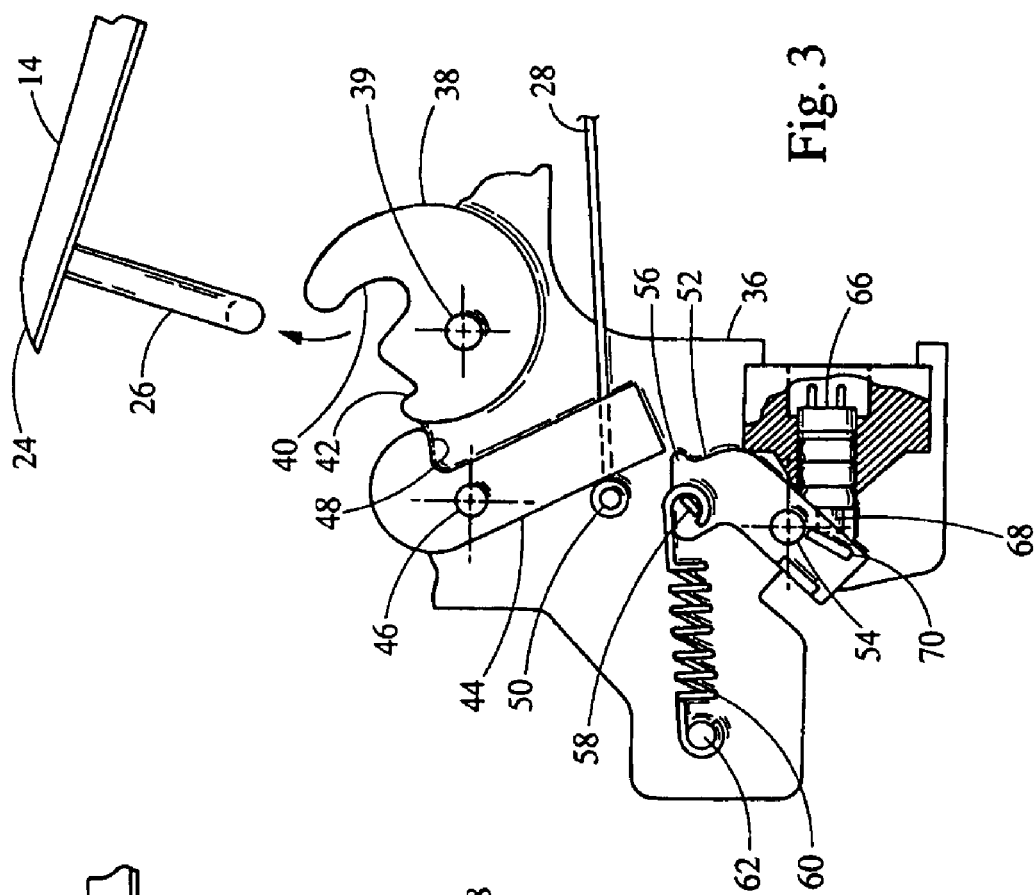
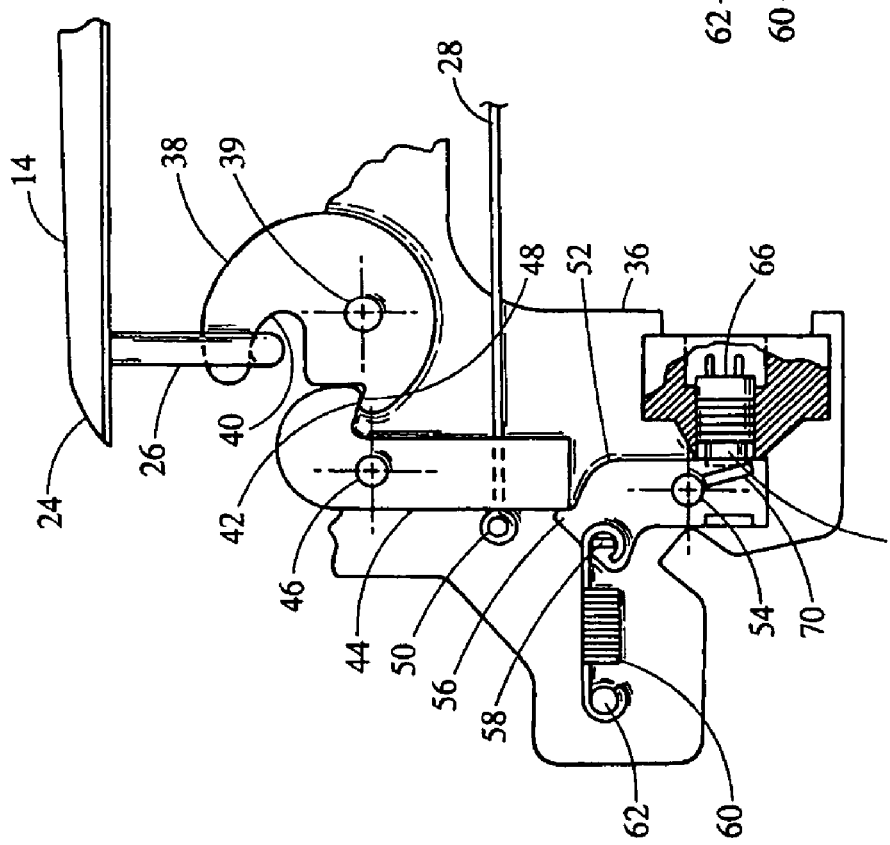

VEHICLE HOOD LATCH RELEASE SYSTEM FOR IMPROVED PEDESTRIAN PROTECTION

BACKGROUND OF THE INVENTION

This invention relates to a system for reducing pedestrian impact injuries caused by motor vehicles striking a pedestrian, and particularly, to a hood latch release system.

Substantial advances have been made in recent years in the improvement of impact protection for motor vehicle occupants. Various strategies incorporating active and passive restraint systems have been implemented in motor vehicles. Sophisticated energy absorbing structures are designed into motor vehicles with an eye toward reducing occupant injuries.

While much progress has occurred in improving the safety of motor vehicle occupants, one segment of victims of motor vehicle collisions has been largely unaddressed; namely, pedestrians. Motor vehicle impacts with pedestrians remain a serious concern, taking the lives of many each year throughout the world and causing severe injuries.

Certain strategies are known to reduce the severity of pedestrian impacts. For example, it is known in the art to provide a motor vehicle with a front hood that raises a predetermined distance to provide for energy absorption in anticipation of a vehicle impact with a pedestrian. Pedestrian injuries can be reduced in this manner since typically, the pedestrian is struck in the lower torso area by the vehicle front end, and their upper body strikes the hood. Lifting the rear edge of the hood enhances its energy absorption characteristics. The current de facto standard for such hood raising is that the hood is to be raised within a thirty millisecond time period. Where such active hood lifting is incorporated into a vehicle, the vehicle's hood has a pair of hinges attached to the rear edge of the hood and the hood has at least one releasable hood latch mounted along the front edge of the engine compartment. To gain access to the vehicle's engine compartment, such hoods are opened by releasing the front mounted hood latch and lifting the hood from the front edge of the hood. Lifting the front of the hood causes the hood to rotate about an axis generally positioned so as to run through or near the rear mounted hinges. In vehicles equipped with hood assemblies of the type previously described, because the rear edge of the hood is raised in an active hood lifting scenario, the front mounted hood latch need not be released in order to activate an active hood lifting system.

There are vehicles such as many produced by the Jaguar Motor Company, for example, where access to the vehicle's engine compartment is provided by lifting and opening the vehicle hood from the rear edge of the hood. In such cases, the hood has a pair of hinges mounted adjacent to the front edge of the hood and there is at least one releasable latch mounted at near the rear edge of the hood. If such a vehicle is equipped with a rear opening hood is to move through a pedestrian protecting hood lifting scenario, not only must the hood latch be released before the hood can be actuated, but also such release must be performed automatically and very rapidly.

The present invention provides a hood latch release system for a motor vehicle for providing impact protection for pedestrians. This system includes an automatically operating fast-acting hood latch release apparatus. Preferably, the hood latch release cooperates with a hood lifting device to raise the rear edge of the hood.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE INVENTION

FIG. 2 is a side view of a hood latch in accordance with the invention shown in a latching condition in which the hood is in a fully closed position; and FIG. 3 is a side view of a hood latch in accordance with the invention shown in a latching condition in which the hood is opened.

DETAILED DESCRIPTION OF THE INVENTION

Figure 1:
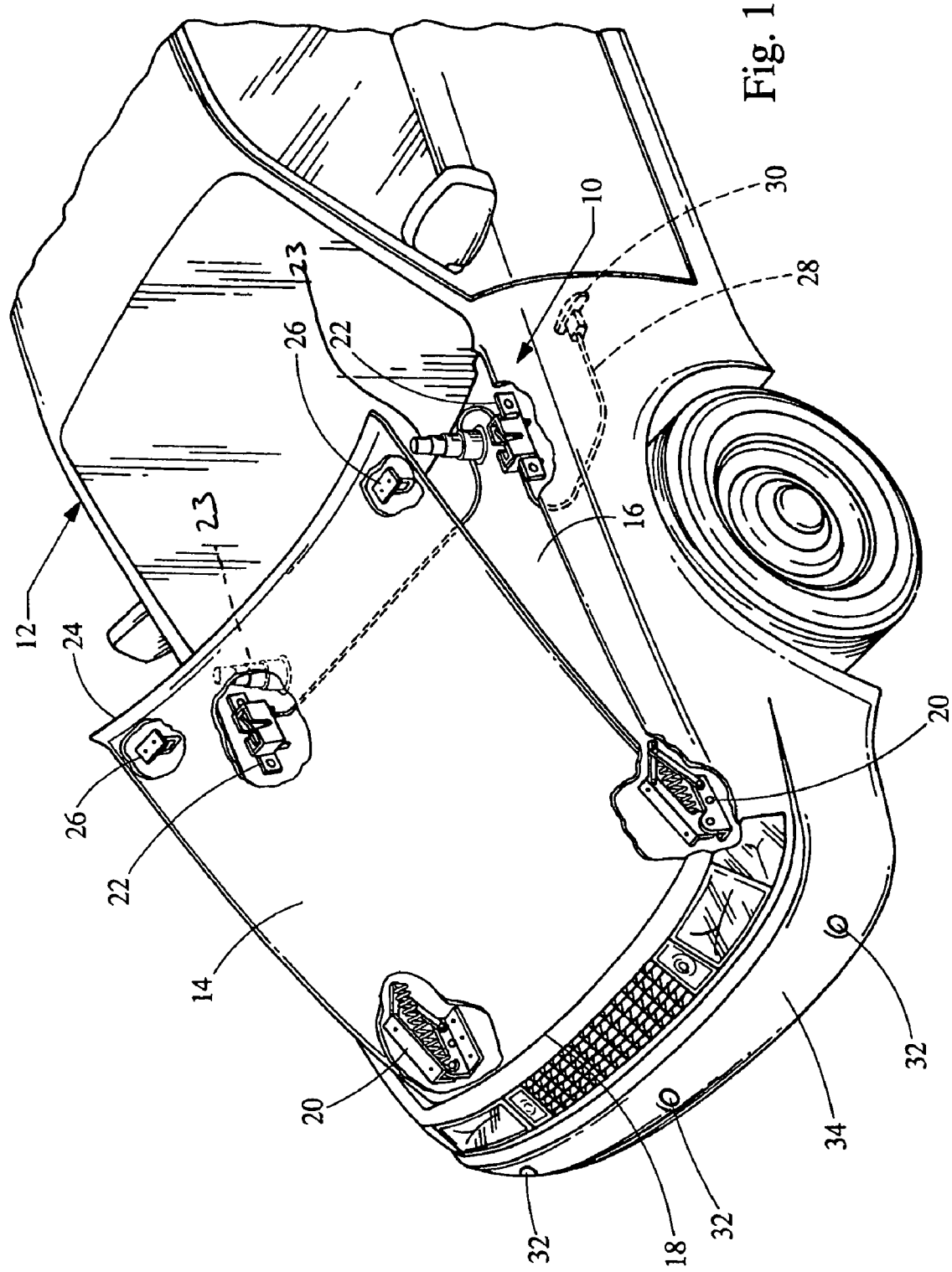
FIG. 1 is a pictorial view of a front end of a motor vehicle incorporating a front hinging hood and the hood latch release system in accordance with the present invention.

A hood latch release system in accordance with the present invention is illustrated in FIG. 1 and is generally designated there by reference number 10. Release system 10 is incorporated within motor vehicle 12 having hood 14 which provides access to engine compartment 16. Hood 14 is mounted for hinging movement generally about the front edge of the hood 18 using a pair of hinges 20. Hood latch release system 10 incorporates a pair of hood latches 22 positioned at or near the hood rear edge 24. Hood 14 may be maintained in a latching condition in which hood 14 is fully closed, covering engine compartment 16. Upon the release of hood latches 22, hood 14 may be opened. The partially raised position shown in FIG. 1 is capable of providing enhanced pedestrian impact protection by providing energy absorption in the event that a pedestrian is struck. Active lifting of hood 14 is provided by hood lifts 23, which extend from a compressed condition rapidly to lift the hood in response to a command signal. Hood lifts 23 may be pyrotechnically actuated and when in the extended position, provide energy absorption from impact loads acting to compress the lifts. Hood lifts 23 are shown in an extended condition in FIG. 1, lifting the rear edge of hood 14. Counter-balancing springs within hinges 20 provide a biasing force counteracting the weight of the hood to ease its opening. Hood lifts 23 may be of the type described by U.S. application Ser. No. 10/193,414 entitled "Linear Actuator" which is hereby incorporated by reference.

Although a pair of hood latches 22 are shown in FIG. 1 mounted at the outboard rear edges of hood 14, it is further possible and within the scope of the present invention to provide a single hood latch 22, preferably mounted at near the centerline of hood 14. However, it is believed that a pair of separate hood latches 22 provides enhanced car body fit and finish by accurately positioning the rear edge of hood 14. Similarly, a single hood lift 23 may suffice for particular vehicle applications.

Hood latches 22 engage with a hood latch engaging element in the form of wire loops 26 affixed to hood 14. Loops 26 engage with hood latches 22 in a manner which will be described in more detail in the following description.

In order to provide access to the vehicle engine compartment 16, cable release mechanism 28 is provided which is activated by the motor vehicle operator to release hood latches 22, permitting access to engine compartment 16. Cable release 28 conveniently incorporates handle 30 mounted within the passenger compartment of motor vehicle 12.

The hood latch release system 10 in accordance with this invention must operate automatically in the event of an impact with a pedestrian. Accordingly, sensors are provided to detect impending or actual impact with a pedestrian. Such sensors can be vision, radar, or ultrasonic based sensors, contact sensors, or other sensors generally designed by reference number 32, mounted to the motor vehicle at its front bumper 34 (or another appropriate location). The details of such sensor systems are beyond the scope of the present invention and numerous types are believed usable in connection with this invention. As an alternative to using the sensor 32 to predict an impending pedestrian impact, a contact-type sensor assembly could be used in which hood latch release system 10 is activated when the pedestrian is struck by vehicle bumper 34. Irrespective of the sensor technology employed, it is necessary to activate hood latch release system 10 and actuate hood lifts 23 prior to the pedestrian's impact with hood 14, as mentioned previously.

Now with reference to FIGS. 2 and 3, details of hood latch 22 are shown. Latch back plate 36 provides a mounting structure for the principal components of hood latch 22. Latch hook 38 is pinned for rotation to back plate 36 about pivot 39 and is moveable between the positions shown in FIGS. 2 and 3. Latch hook 38 includes notch 40 which engages with hood loop 26, and further includes notch 42. Latch lever 44 is pinned to back plate 36 for rotational movement about pivot 46 and includes a tooth 48 which engages with latch hook notch 42. Cable release end 50 engages latch lever 44, and causes it to move as will be described in more detail below. Latch pawl 52 is pinned for rotation to back plate 36 at pivot 54. Pawl 52 includes tooth 56 which engages latch lever 44. A projecting lug 58 of latch pawl 52 provides a point for engagement for tension spring 60 which is mounted at its other end to back plate post 62.

Actuator 66 is provided to activate hood latch release system 10 in the event of an impending pedestrian impact with hood 14. Actuator 66 employs an internal reservoir of compressed gas or a chemical reaction to move between its normal position, illustrated in FIG. 2, to its activated condition illustrated in FIG. 3 in which plunger 68 is caused to extend from actuator 66. Actuator plunger 68 engages with pawl lug 70. Actuator 68 responds to signals which originate from sensors 32, processed by a suitable electronic processing unit.

Latch hook 38 is preferably rotationally biased through the influence of a torsion spring (not shown), urging it to the opened position as shown in FIG. 3. Latch hook notch 40 is shaped such that upon engagement with loops 26 as hood 14 is being closed, contact occurs with the notch in a manner that exerts a rotational force on latch hook 38 opposite that of its torsion spring, causing the latch hook 38 to rotate from its opened position shown in FIG. 3, to its closed position shown in FIG. 2.

FIG. 2 illustrates the condition of hood latch release system 10 in a first latching condition in which hood 14 is in a fully closed condition, covering engine compartment 16. In this condition, latch hook notch 40 engages hood loop 26 to retain the hood in the position previously described. Latch hook 38 is maintained in this position through engagement between its notch 42 and latch lever tooth 48.

In the event that the motor vehicle operator desires to open hood 14, tension on cable release 28 urges latch lever 44 to rotate in a counterclockwise direction to the position illustrated in FIG. 3, allowing latch hook 38 to rotate in the clockwise direction, releasing its engagement with loop 26 and therefore hood 14, placing the hood latch in a second opened latching condition. Hood latch 22 may also be moved to the second opened latching condition through operation of actuator 66. When an appropriate activation signal is directed to actuator 66, plunger 68 moves from its normal position shown in FIG. 2 to its extended position shown in FIG. 3. Such motion of plunger 68 causes latch pawl 52 to rotate in the clockwise position as shown in FIG. 3, pushing latch lever 44 to rotate in a counterclockwise direction in a manner similar to its movement when manually released by cable release 28. The motion of plunger 68 overcomes the spring tension applied by spring 60. As mentioned previously, such actuation of hood latch 22 occurs with activation of hood lifts 23, such that the rear edge of hood 14 is released and forcibly elevated by lifts 23.

In vehicles in which a pair of separate hood latches 22 are provided, cable release 28 would pass through one of the hood latches 22 to also communicate with the second hood latch 22. The configuration of hood latch 22 described above enables automatic operation in the event of an impending vehicle impact to occur without interfering with normal manual operation of the hood latch.

While the above description constitutes the preferred embodiment of the present invention, it will be appreciated that the invention is susceptible to modification, variation and change without departing from the proper scope and fair meaning of the accompanying claims.

The invention claimed is:

1. A hood latch release system for enabling lifting of a hood of a motor vehicle for providing impact protection for a pedestrian in the event of an impact with the motor vehicle, comprising:
   a hood latch engaging element coupled to the hood,
   a hood latch engaging the hood latch engaging element and providing at least two latching conditions including a first latching condition engaging the hood in a substantially closed position, and a second latching condition wherein the hood is released to be at least partially opened for providing the enhanced pedestrian impact protection, the hood latch in the second latching condition permitting the hood to be opened to provide access to the engine compartment of the motor vehicle,
   a hinge connected to the hood permitting the hood to rotate generally about a hood edge when moving between the first and second latching conditions of the hood latch, and
   a release actuator for moving the hood latch from the first latching condition to the second latching position upon at least one event of the following group of events consisting of an anticipated impact with the pedestrian and an impact with the pedestrian.

2. The hood release system in accordance with claim 1 further comprising a hood lift for raising the hood in the event of the anticipated impact.

3. The hood release system in accordance with claim 1 further comprising a sensor for sensing the anticipated impact between the pedestrian and the motor vehicle.

4. A hood latch release system for enabling lifting of a hood of a motor vehicle for providing impact protection for a pedestrian in the event of an impact with the motor vehicle, comprising:
   a hood latch engaging element coupled to the hood,
   a hood latch engaging the hood latch engaging element and providing at least two latching conditions including a first latching condition engaging the hood in a substantially closed position, and a second latching condition wherein the hood is released to be at least partially opened for providing the enhanced pedestrian impact protection, a hinge connected to the hood permitting the hood to rotate generally about a hood edge when moving between the first and second latching conditions of the hood latch, a release actuator for moving the hood latch from the first latching condition to the second latching position upon at least one event of the following group of events consisting of an anticipated impact with the pedestrian and an impact with the pedestrian, and a manual release cable activated by an operator of the motor vehicle to move the hood release latch between the first and the second latching conditions, the manual release cable acting on a latch lever of the hood latch and the release actuator acting on the latch lever.

5. A hood latch release system for enabling lifting of a hood of a motor vehicle for providing impact protection for a pedestrian in the event of an impact with the motor vehicle, comprising:

a hood latch engaging element coupled to the hood, a hood latch engaging the hood latch engaging element and providing at least two latching conditions including a first latching condition engaging the hood in a substantially closed position, and a second latching condition wherein the hood is released to be at least partially opened for providing the enhanced pedestrian impact protection, a hinge connected to the hood permitting the hood to rotate generally about a hood edge when moving between the first and second latching conditions of the hood latch, a release actuator for moving the hood latch from the first latching condition to the second latching position upon at least one event of the following group of events consisting of an anticipated impact with the pedestrian and an impact with the pedestrian, and wherein the release actuator comprises a plunger urged to move under influence of an expanding gas.

6. The hood release system in accordance with claim 1 wherein a pair of the hood latches are provided mounted adjacent outboard edges of the hood rear edge.

7. A hood latch release system for enabling lifting of a hood of a motor vehicle for providing impact protection for a pedestrian in the event of an impact with the motor vehicle a hood latch engaging element coupled to the hood, a hood latch engaging the hood latch engaging element and providing at least two latching conditions including a first latching condition engaging the hood in a substantially closed positioned second latching condition wherein the hood is released to be at least partially opened for providing the enhanced pedestrian impact protection, a hinge connected to the hood permitting the hood to rotate generally about a hood edge when moving between the first and second latching conditions of the hood latch, a release actuator for moving the hood latch from the first latching condition to the second latching position upon at least one event of the following group of event consisting anticipated impact with the pedestrian and an impact with the pedestrian, and wherein the hood latch further comprises a latch hook engaging with the hood latch engaging element, a latch lever engaging the latch hook and a latch pawl, the latch pawl acted upon by the release actuator.

8. The hood release system in accordance with claim 7 wherein the hood release system further comprises a manual release cable activated by an operator of the motor vehicle to move the hood release between the first and second latching conditions, the manual release cable acting upon the latch lever to cause the latch to move from the first latching condition to the second latching condition.

9. The hood release system in accordance with claim 7 wherein the hood latch release system further comprises biasing means for urging the hood to move from the fully closed position to the partially opened position.

* * * * *